(12) United States Patent
Dearth et al.

(10) Patent No.: US 12,326,820 B2
(45) Date of Patent: Jun. 10, 2025

(54) MULTICAST AND REFLECTIVE MEMORY BEHAVIOR FOR MEMORY MODEL CONSISTENCY

(71) Applicant: NVIDIA Corporation, Santa Clara, CA (US)

(72) Inventors: Glenn Alan Dearth, Groton, MA (US); Mark Hummel, Franklin, MA (US); Daniel Joseph Lustig, Somerville, MA (US)

(73) Assignee: NVIDIA Corporation, Santa Clara, CA (US)

( * ) Notice: Subject to any disclaimer, the term of this patent is extended or adjusted under 35 U.S.C. 154(b) by 218 days.

(21) Appl. No.: 17/578,266

(22) Filed: Jan. 18, 2022

(65) Prior Publication Data
US 2023/0229599 A1    Jul. 20, 2023

(51) Int. Cl.
*G06F 12/10*         (2016.01)
*G06F 12/02*         (2006.01)
(Continued)

(52) U.S. Cl.
CPC ...... *G06F 12/1072* (2013.01); *G06F 12/0238* (2013.01); *G06F 12/10* (2013.01);
(Continued)

(58) Field of Classification Search
CPC .. G06F 9/542; G06F 12/1036; G06F 12/1072; G06F 12/109; G06F 12/10;
(Continued)

(56) References Cited

U.S. PATENT DOCUMENTS 5,331,637 A * 7/1994 Francis ............... H04L 12/1854
                                                        370/408
2006/0256793 A1* 11/2006 Swartzentruber ....... H04L 49/90
                                                        370/394
(Continued)

OTHER PUBLICATIONS

Technologies behind Distributed Deep Learning AllReduce by Fukuda 2018 (Year: 2018).*
(Continued)

*Primary Examiner* — Paul M Knight
(74) *Attorney, Agent, or Firm* — Taylor English Duma L.L.P.

(57) ABSTRACT

In various examples, a memory model may support multicasting where a single request for a memory access operation may be propagated to multiple physical addresses associated with multiple processing elements (e.g., corresponding to respective local memory). Thus, the request may cause data to be read from and/or written to memory for each of the processing elements. In some examples, a memory model exposes multicasting to processes. This may include providing for separate multicast and unicast instructions or shared instructions with one or more parameters (e.g., indicating a virtual address) being used to indicate multicasting or unicasting. Additionally or alternatively, whether a request(s) is processed using multicasting or unicasting may be opaque to a process and/or application or may otherwise be determined by the system. One or more constraints may be imposed on processing requests using multicasting to maintain a coherent memory interface.

20 Claims, 8 Drawing Sheets

(51) Int. Cl.
*G06F 12/1045* (2016.01)
*G06F 12/1072* (2016.01)
*G06F 12/109* (2016.01)
*G06F 13/16* (2006.01)

(52) U.S. Cl.
CPC ...... *G06F 12/1054* (2013.01); *G06F 12/1063* (2013.01); *G06F 12/109* (2013.01); *G06F 13/1668* (2013.01)

(58) Field of Classification Search
CPC ............. G06F 12/1063; G06F 12/0238; G06F 12/1054; G06F 12/1068; G06F 13/1668
See application file for complete search history.

(56) References Cited

U.S. PATENT DOCUMENTS

| | | | |
|---|---|---|---|
| 2016/0259680 A1* | 9/2016 | Evans | G06F 11/0793 |
| 2017/0192901 A1* | 7/2017 | Coffin | H04L 49/70 |
| 2019/0146825 A1* | 5/2019 | Dang | G06F 12/1009 718/1 |
| 2020/0159669 A1* | 5/2020 | Duncan | G06F 12/1027 |
| 2021/0075633 A1* | 3/2021 | Sen | G06F 12/0813 |
| 2022/0066955 A1* | 3/2022 | Graif | G06F 1/3253 |
| 2022/0114096 A1* | 4/2022 | Striramassarma | G06F 9/30043 |
| 2022/0166705 A1* | 5/2022 | Froese | H04L 47/20 |

OTHER PUBLICATIONS

Translation Lookaside Buffer (TLB) in Paging by LilPump 2020 (Year: 2020).*
SmartIO Zero overhead Device Sharing by Markussen 2021 (Year: 2021).*
A history of NVidia Stream Multiprocessor by Sanglard 2020 (Year: 2020).*
NPL Evtushenko Multi GPU programming with CUDA 2020.*

* cited by examiner

| Instruction | | Type | Perform on Unicast | Perform on Multicast |
|---|---|---|---|---|
| Store | 202 | Unicast | Store | Fault or Store @ target |
| Load | 204 | Unicast | Load | Fault or Load @ target |
| Atomic | 206 | Unicast | Atomic | Fault or Atomic @ target |
| Reduce | 208 | Unicast | Reduce | Fault or Reduce @ target |
| Reducing Load | 210 | Multicast | Fault | Reducing Load |
| Store-MC | 212 | Multicast | Fault | Store-MC |
| Reduce-MC | 214 | Multicast | Fault | Reduce-MC |

FIGURE 2

MULTICAST AND REFLECTIVE MEMORY BEHAVIOR FOR MEMORY MODEL CONSISTENCY

BACKGROUND

Computing processes may leverage multiple processing elements, such as streaming multiprocessors (SMs) of graphics processing units (GPUs), to perform processing operations. To do so, the processing elements may provide requests for memory access, which may involve reading from and/or writing to memory using a memory model. The memory model may allow for the processing elements to coordinate on reading and writing data, which is crucial for supporting parallel or otherwise coordinated processing. For example, in systems where memory is distributed across multiple GPUs, each SM of a GPU may read from and/or write to either local memory of the GPU or remote memory of another GPU. To facilitate coordination between the SMs, the memory model may implement a virtual addressing scheme where virtual addresses (VAs) are mapped to physical addresses (PAs) across the GPUs. To maintain coherency, each VA may map to a particular PA such that any SM may use the VA to request a memory operation be performed using the particular PA.

When processing elements are performing coordinated processing, some processing operations may involve receiving data from and/or providing data to multiple processing elements. For example, an all-reduce operation may involve collecting data from each processing element to perform reductions (e.g., a sum, a max, etc.) across devices and broadcasting the result to each processing element. Collecting the data may require a memory access request for each processing element and broadcasting the result may again require a memory access request for each processing element. As such, the required number of requests may increase with the number of participating processing elements, increasing latency and/or bandwidth requirements. This overhead may be especially impactful in deep learning, where all-reduce has become a key operation that is performed at a high frequency.

SUMMARY

Embodiments of the present disclosure relate to multicast and reflective memory behavior for memory model consistency. Systems and methods are disclosed that provide for multicasting memory access requests from processing elements. Disclosed approaches may be compatible with unicast memory models while ensuring coherency amongst the processing elements.

In contrast to conventional approaches, such as those described above, a memory model may support multicasting where a single request for a memory access operation may be propagated to multiple physical addresses associated with multiple processing elements (e.g., corresponding to respective local memory). Thus, the request may cause data to be read from and/or written to memory for each of the processing elements. In some examples, a memory model exposes multicasting to processes. This may include providing for separate multicast and unicast instructions or shared instructions with one or more parameters (e.g., indicating a virtual address) being used to indicate multicasting or unicasting. Additionally or alternatively, whether a request(s) is processed using multicasting or unicasting may be opaque to a process and/or application or may otherwise be determined by the system. One or more constraints may be imposed on processing requests using multicasting to maintain a coherent memory interface.

BRIEF DESCRIPTION OF THE DRAWINGS

The present systems and methods for multicast and reflective memory behavior for memory model consistency are described in detail below with reference to the attached drawing figures, wherein:

FIG. 2 is a table illustrating examples of how operations may be performed using unicasting or multicasting, in accordance with some embodiments of the present disclosure;

DETAILED DESCRIPTION

Embodiments of the present disclosure relate to multicast and reflective memory behavior for memory model consistency. Systems and methods are disclosed that provide for multicasting memory access requests from processing elements. Disclosed approaches may be compatible with unicast memory models while ensuring coherency amongst the processing elements.

In accordance with aspects of the disclosure, a memory model may support multicasting where a single request for a memory access operation may be propagated to multiple physical addresses associated with multiple processing elements (e.g., corresponding to respective local memory), thereby allowing for the request to cause data to be read from and/or written to memory for each of the processing elements. In at least one embodiment, the request may indicate a virtual address, and the virtual address may be mapped to the physical addresses. The request may then be processed using memory accesses to corresponding memories, which may be distributed across multiple devices, such as graphics processing units (GPUs). In one or more embodiments, a switch may be used to propagate the request, which may be at least partially internal to one or more of the devices or may be at least partially external to the devices.

A memory model may expose multicasting to processes, such that a process may specify or indicate multicasting for a request(s), create or indicate a group(s) of processing elements for multicasting, and/or select between multicasting or unicasting for a request(s) and/or particular VAs. For example, a first set of VAs may indicate multicasting and another set of VAs may indicate unicasting. Additionally or alternatively, whether a request(s) is processed using multicasting or unicasting may be opaque to a process and/or application or may otherwise be determined by the system. To maintain a coherent memory interface, the memory model may impose one or more constraints on processing requests using multicasting, such as to ensure the same results regardless of whether one or more requests are processed using multicasting or unicasting.

Figure 1:
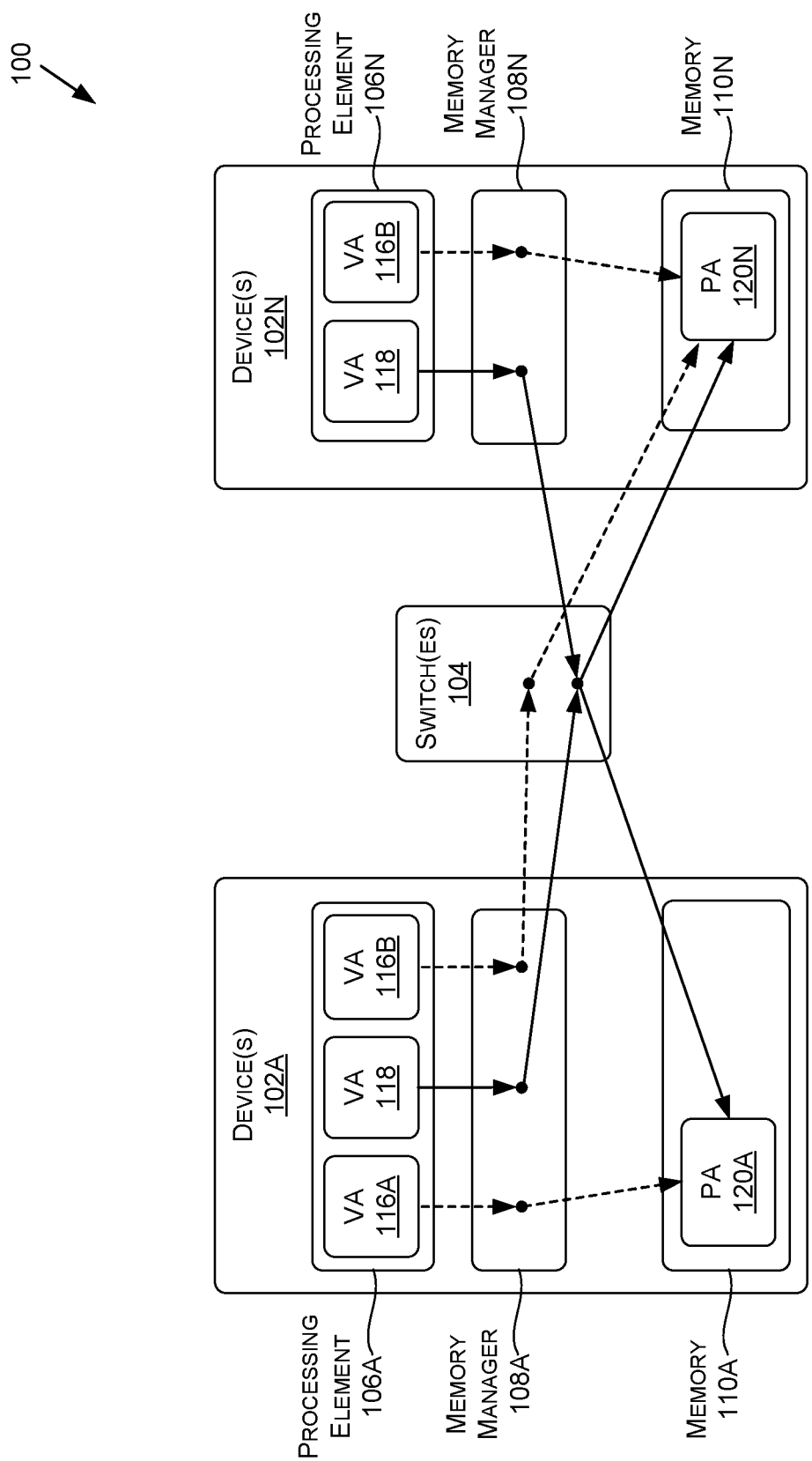
FIG. 1 is a diagram illustrating examples of translation paths of a memory system implementing separate memory spaces for unicasting and multicasting in a collaborative processing environment, in accordance with some embodiments of the present disclosure.

With reference to FIG. 1, FIG. 1 is a diagram illustrating examples of translation paths of a memory system implementing separate memory spaces for unicasting and multicasting in a collaborative processing environment 100, in accordance with some embodiments of the present disclosure.

It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of any number of instances of example computing device 700 of FIG. 7, and/or example data center 800 of FIG. 8.

The collaborative processing environment 100 may include one or more devices, such as devices 102A though device 102N (also referred to herein as "devices 102"). The collaborative processing environment 100 may also include one or more switches, such as a switch 104. The collaborative processing environment 100 may further include one or more processing elements, such as processing elements 106A through 106N (also referred to herein as "processing elements 106"). The collaborative processing environment 100 may further include one or more memory managers, such as memory managers 108A through 108N (also referred to herein as "memory managers 108"). Also, the collaborative processing environment 100 may include one or more memories, such as memories 110A through 110N (also referred to herein as "memories 110"). By way of example and not limitation, the device 102A includes the processing element 106A, the memory manager 108A, and the memory 110A. Similarly, the device 102N includes the processing element 106N, the memory manager 108N, and the memory 110N. Although a single processing element 106 is shown within each device 102, a device 102 may include any number of processing elements 106, such as tens to hundreds or more. Other devices included in the devices 102, when present, may include similar corresponding components.

Examples of a device 102 includes a GPU, a CPU, a logic unit (e.g., the logic unit 720), an integrated circuit, and/or a combination of one or more thereof. The switch 104 may generally correspond to a coherent fabric interconnecting the devices 102, the processing elements 106, the memory managers 108, and/or the memories 110. In embodiments, the switch 104 may enable parallel or otherwise coordinated processing amongst the devices 102 and/or the processing elements 106. In at least one embodiment, the switch 104 provides a direct device-to-device interconnect or network between the devices 102. The switch 104 may allow transmissions from any number of the devices 102 and/or components thereof to be routed to any of the other devices 102.

Although the switch 104 is shown as being external to the devices 102 (e.g., on a separate device or integrated circuit), in at least one embodiment, one or more portions of the switch 104 and/or the functionality thereof may be incorporated into one or more of the devices 102. Further, although one switch 104 is shown, the switch 104 may represent any number of switches connecting the devices 102 in any suitable topology. When multiple switches are provided, different switches may form different multicast groups of devices 102, as described herein. Multicast groups may have hierarchical relationships where results of a subgroup to a group may be treated as a result of an individual device or node within the group.

Examples of the processing elements 106 include one or more streaming multiprocessors (SMs), single instruction, multiple data (SIMD) units, cores, such as CPU cores, multithreaded processing units, parallel processing units, etc. In at least one embodiment, a processing element 106 may be configured to execute one or more thread blocks and/or thread groups in parallel.

In one or more embodiments, each device 102 includes its own memory 110 (physical memory such as random access memory) implemented using its own memory system and memory bus. The memory managers 108 and/or switches 104 may be used to effectively extend the memory buses to one or more other devices 102. In other examples, one or more of the devices 102 may share at least some of the memory 110.

Examples of the memory managers 108 include one or more memory controllers, such as a memory chip controller (MCC), a memory controller unit (MCU), and/or a memory management unit (MMU), such as a GPU MMU (GMMU), a paged MMU (PMMU), etc. In at least one embodiment, a memory manager 108 may be configured to perform one or more portions of address translation. For example, each memory manager 108 may receive a request from its corresponding processing element 106 indicating one or more VAs, and provide data corresponding to the one or more VAs and/or request to a switch 104 for further processing, which may include initial or further address translation. Examples of requests (memory access requests) for memory access operations include those for loads, stores, and/or atomics, which may be sent out to the memory system, with the memory system optionally returning back one or more values in response.

In at least one embodiment, per-process VAs may be translated to PAs and/or intermediate addresses. Further, a memory manager 108 may perform at least some of the address translation. For example, each memory manager 108 may translate a VA to an intermediate address (e.g., a fabric linear address of a global virtual address space into which different processing nodes or elements may uniquely map one or more ranges of local physical memory), which may be used for further translation to one or more PAs. For example, in various embodiments, a switch 104 may receive one or more PAs (e.g., in a request) translated from a VA (e.g., translated by a memory manager 108 providing the one or more PAs), or may receive an intermediate address (e.g., translated by a memory manager 108 providing the intermediate address), which may be forwarded to one or more corresponding devices 102 for further translation. In one or more embodiments a translation lookaside buffer (TLB), such as a link TLB, may be used to translate the intermediate address to a PA. For example, the switch 104 may provide the intermediate address to one or more of the devices 102 for translation to a corresponding PA using a corresponding TLB of the device 102.

In at least one embodiment, the memory manager 108 may translate a VA to a PA for unicast memory access (e.g., using the VA 116A), and translate a VA to an intermediate address for multicast memory access (e.g., using the VA 118). While in some examples, a switch 104 does not perform address translation, in other examples a switch 104 may perform at least some of the address translation. For example, a switch 104 may receive a VA (e.g., in a request) and translate the VA to multiple PAs, or may receive an intermediate address (e.g., from a memory manager 108), and translate the intermediate address to multiple PAs.

As indicated in FIG. 1, in one or more embodiments a processing element 106 may use a VA that is translated to its own PA or a PA of another device 102 for memory access. For example, FIG. 1 shows the processing element 106A may provide a request indicating a VA 116A, which points to a PA 120A of the processing element 106A. FIG. 1 also shows the processing element 106A may provide a request indicating a VA 116B, which points to a PA 120N of the processing element 106N. Further, the processing element 106N may provide a request indicating the VA 116B, which points to the PA 120N of the processing element 106N. Thus, the same VA may be provided by either device 102 to access the same PA. For example, the requests may be provided by one or more processes running on the devices 102A and 102N (e.g., one or more threads thereof) running one or more applications while sharing memory space.

The VAs 116A and 116B are examples of unicast VAs. Receiving a unicast VA in a request may indicate to the memory system that the request is for a unicast memory operation in which the VA is translated to a single PA and a corresponding memory access. The memory system may also support multicast VAs. Receiving a multicast VA in a request may indicate to the memory system that the request is for a multicast memory operation in which the VA is translated to multiple PAs and corresponding memory accesses. For example, a memory manager 108 may be configured to use the VA to determine whether to translate the VA to a PA or an intermediate address, where an intermediate address may indicate multicasting to a switch 104 and a PA may indicate unicasting to the switch 104. For example, FIG. 1 shows the processing element 106A or the processing element 106N may provide a request indicating a VA 118, which points to the PA 120A of the processing element 106A and the PA 120N of the processing element 106N. Thus, the same VA may be provided by either device 102 to access the same PAs.

Thus, in accordance with one or more embodiments, multicast memory access and unicast memory access may be mapped to different VA spaces. In at least one embodiment, a process may perform at least some of the mapping. By way of example, and not limitation, the process may allocate memory for VA 116A and 116B using an allocation instruction (e.g., an API call), such as in the form: VA 116A, VA 116B=Malloc( ), which when executed may allocate PAs for each specified VA, with the VAs being configured as unicast VAs in the memory system.

By way of example, and not limitation, to configure one or more VAs in the memory system as multicast VAs, the process may allocate memory for the VA 118 (and/or other VAs) using a mapping instruction (e.g., an API call), such as in the form: VA 118=CreateMulticastAlias(VA 116A, VA 116B). This mapping instruction may specify one or more VAs that are to be configured as multicast VAs (e.g., VA 118), as well as one or more VAs (e.g., the VA 116A and the VA 116B) for which corresponding PAs are to be mapped to the specified VA(s). In this example, memory for the VA 116A and the VA 116B may be allocated prior to the mapping instruction. In other examples, executing the mapping instruction may allocate memory for one or more VAs and/or PAs to be mapped to the multicast VA(s). Further, in the present example, the PAs mapped to the multicast VA (e.g., the VA 118 mapped to the PAs 120A and 120N) are also mapped to unicast VAs (e.g., the VA 116A and the VA 116B), which need not be the case in some embodiments.

As the VAs indicate whether an instruction is to be processed as a multicast memory access or a unicast memory access, multicast memory accesses may be incorporated into the memory system while retaining unicast syntax. Additionally or alternatively, different multicast and unicast instructions (and/or operands or parameters of the same instruction) may be provided to indicate whether the instruction is to be processed using multicasting or a unicasting. In such examples, separate unicast and multicast VA spaces may not be needed (but still may be used). For example, a memory manager 108 and/or the switch 104 may receive an instruction and may generate different addresses (e.g., a PA or an intermediate address), and/or determine which one or more devices 102 to provide data corresponding to the request to, depending on whether it identifies the instruction as a multicast instruction or a unicast instruction.

Referring now to FIG. 2, FIG. 2 is a table 200 illustrating examples of how operations may be performed using unicasting or multicasting, in accordance with some embodiments of the present disclosure. In one or more embodiments, where there is a mismatch between the instruction type provided and the VA space, the instruction may be still be processed or may trigger a fault. The table 200 provides an example approach, but other approaches may be used. In the approach indicated in the table 200, where a unicast instruction is provided in association with a multicast VA, the instruction may still be processed or may trigger a fault. For example, the unicast instruction may be processed with respect to a single target PA of a multicast group, as indicated with respect to instructions 202, 204, 206, and 208. Thus, for example, if the instruction 208 is provided in association with a multicast VA, a reduce operation may be performed using the target PA (e.g., similar to an atomic operation except that a value is not returned to the requester). In at least one embodiment, the target PA may be specified or indicated by the process, a memory manager 108, and/or may be set to a default. For example, the target PA may be programmed during construction of the unicast and/or multicast spaces (e.g., via one or more API calls) and/or may be indicated in the unicast instruction. In some embodiments, if no target PA is specified or determined, a fault may be returned (e.g., any faults described herein may be provided to a requesting memory manager 108 and/or process). Also indicated in the table 200, where a multicast instruction is provided in association with a unicast VA, the instruction may trigger a fault.

The table 200 shows instructions 210, 212, and 214, which are non-limiting examples of multicasting instructions which may leverage multicasting functionality described herein to perform multicasting operations. Other multicasting operations may be used in accordance with embodiments of the disclosure. As indicated herein, in one or more embodiments, when executing a multicast operation, values from a memory 110 may be provided to the switch 104 and/or one or more values may be provided to one or more of the devices 102 in the multicast group. For example, a value from a device 102 that initiated a request may be provided to a corresponding processing element 106A via an internal path of the device 102 whereas values from other devices 102 may be provided through a switch 104. In at least one embodiment, software, such as a process or application may specify or indicate whether the internal path should be used (e.g., in the request or instruction). In at least one embodiment, an internal path in a device 102 may have lower latency and bandwidth than a link leaving the device 102. Thus a request from the processing element 106A of the device 102A may reach the memory 110A faster than if the request were sent to the switch 104, then reflected back to the device 102A. However, for some software protocols it may be desirable to reflect the request back so that all devices 102 are treated the same when processing the request.

The instruction 210 corresponds to a reducing load operation which may include multicasting to one or more nodes of a multicast group resulting in N responses (e.g., loaded values), performing one or more aggregations of the N responses to generate aggregated data, then providing the aggregated data to at least one node of the multicast group. For example, the N responses may be combined into one value, which may be provided to the requesting processing element 106 and/or process. Various approaches may be used to combine the responses, such as a sum, an average, a minimum value, a maximum value, a result of a BITAND, a BITOR, or other bitwise operation, etc. In various examples, combining the responses may include selecting a subset of one or more of the responses and/or generate a statistical value corresponding to at least one of the responses.

In at least one embodiment, the switch 104 may receive the N responses and generate the aggregated data by performing one or more portions of the combination. However, in one or more embodiments, the reduction or combination may occur, at least in part, on one or more of the devices 102, such as the requesting device 102 and/or a device(s) 102 that is to receive a response to the request. For example, assume the requesting device 102 is the device 102A in FIG. 1. The responses for the remaining devices 102, including the device 102N may be received and aggregated by the switch 104. The response for the device 102A may be received from the memory 110A without using the switch 104 (e.g., through a path internal to the device 102A). The device 102A may receive the aggregated responses (e.g., based on being the requesting device 102 and/or a device 102 that is to receive a response) and combine that with the internally received response to generate one or more values to include in a response to the request.

The instruction 212 corresponds to a multicast store operation, which may include multicasting one or more values to one or more nodes of a multicast group to store the one or more values to each of the nodes. The instruction 214 corresponds to a reduce multicast operation, which may include performing an atomic operation on each PA of a multicast group without returning a response.

In at least one embodiment, one or more of the memory access operations may be performed asynchronously with respect to the devices 102, the processing elements 106 and/or the memories 110. Thus, when requests are propagated (e.g., duplicated) to access the memories 110 using multicasting, the accesses to various PAs may be performed asynchronously along with the receiving of any responses. For example, if multiple multicast operations are performed consecutively, because of varying latencies, the order of stores and loads for different memories 110 may vary causing unpredictable results. Similar results may occur for embodiments where the memory system supports both multicasting operating and unicasting operations. As an example, a multicast store may be performed on the VA 118, followed by a unicast store by the processing element 106A to the VA 116A. As the internal path for the VA 116A to the PA 120A is shorter, the unicast store to the VA 116A may be completed before the multicast store to the VA 118 even though the request was made later. As such, the process issuing requests may need to account for these possibilities. For example, these possibilities may occur due to the memory system being configured to allow weak ordering between memory access operations and/or request processing.

In at least one embodiment, the memory system may be configured with one or more constraints so that the process(es) need not account for such unpredictability. As such, using disclosed approaches, whether multicasting is being performed at all may be completely hidden from processes. For example, in one or more embodiments, code written for a memory system that only supports unicast operations may be executed using one or more multicast operations in place of one or more of the unicast operations. Thus, multicasting may not necessarily be explicitly exposed or requested through the API in some embodiments, but may still be performed. As such, the programming model may remain unchanged from a non-multicasting system. Such embodiments may be implemented using one or more separated VA spaces for multicasting and unicasting and/or shared VA spaces for multicasting and unicasting (e.g., both approaches may be implemented using the same memory system). Additionally or alternatively, the process(es) and/or other may configure one or more of the constraints (e.g., using one or more API calls) so that the memory system operates in a manner anticipated or expected by the process(es).

Figure 3:
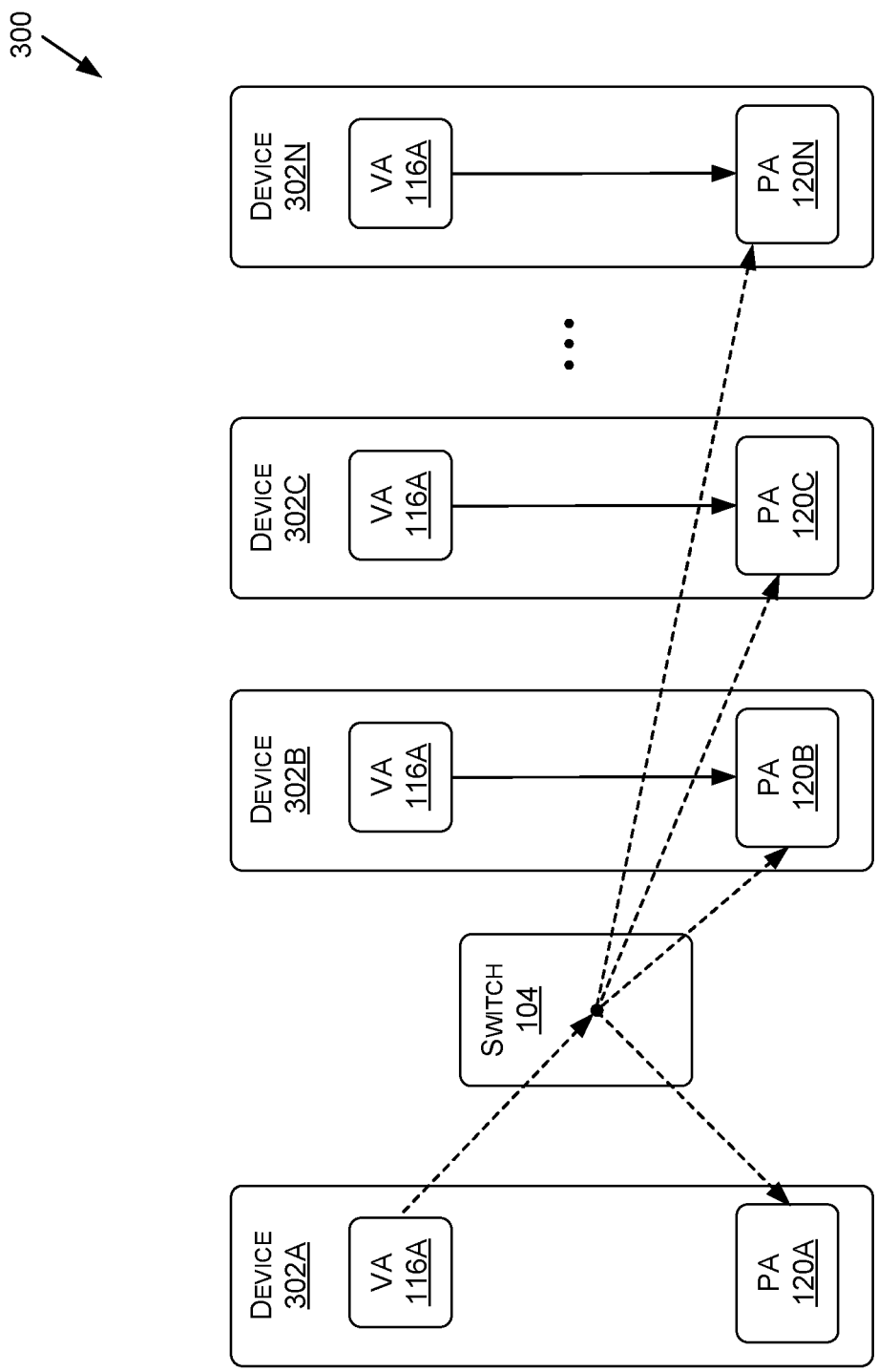
FIG. 3 is a diagram illustrating examples of translation paths of a memory system implementing multicasting using constraints in a collaborative processing environment, in accordance with some embodiments of the present disclosure.

Referring now to FIG. 3, FIG. 3 is a diagram illustrating examples of translation paths of a memory system implementing multicasting using constraints in a collaborative processing environment 300, in accordance with some embodiments of the present disclosure. The collaborative processing environment 300 may include one or more devices, such as devices 302A, 302B, and 302C though device 302N (also referred to herein as "devices 302"). The devices 302 may be similar to or different than the devices 102 of FIG. 1. In various embodiments, the collaborative processing environment 300 (and the memory system) may be the same as or different than the collaborative processing environment 100. Thus, one or more of the devices 102 may be the same as or different than the devices 302 in various embodiments. Further, although the processing elements 106, the memory managers 108, and the memories 110 are not shown, the same or similar components may be included in the devices 302.

The constraints implemented in the collaborative processing environment 300 may vary depending on the capabilities and configurations of various components of the collaborative processing environment 300, such as but not limited to the memory system and the programming model. In various examples, one or more constraints may be enforced using any combination of the memory managers 108, the switch(es) 104, the memories 110, and/or other components (e.g., page tables, TLBs, drivers, etc.).

An example of a constraint is on access permissions of one or more devices 302 and/or processing elements 106 to one or more particular VAs. For example, one or more devices 302 may have write access to one or more particular VAs, such as the VA 116A, whereas one or more other devices 302 may have read-only access. A device 302 (or processing element 106) having write access may be referred to herein as a producer and a device 302 having read-only access may be referred to herein as a consumer. By way of example and not limitation, only the device 302A may be a producer and the other devices 302 may be consumers in one or more embodiments. In various examples, a device 302 may be a producer or consumer for some VAs and not for others.

Constraints involving setting or otherwise limiting the access permissions to one or more particular VAs may be used to avoid unpredictable responses to requests. In disclosed examples, because only the device 302A may write to the VA 116A, race conditions for other writes from other devices 302 may be avoided and the same value may exist in all of the PAs 120 when reads occur.

Another example of a constraint is on access paths for a processing element 106, device 302, and/or one or more particular VAs when performing one or more particular memory accesses and/or memory access or operation types (e.g., load, store, reduce, etc.) or otherwise processing one or more requests. By way of example and not limitation, the device 302A and/or each producer may have a constraint that all requests (or particular requests having certain characteristics such as access type or under certain conditions) are forwarded to the switch 104. Where a request is provided to the switch 104 and is to be processed at the device 302A, the request may be reflected back to the device 302A.

Constraints involving setting or otherwise controlling the access paths may also be used to avoid unpredictable responses to requests. In disclosed examples, because all requests from the device 302A involving the VA 116A are reflected back to the device 302A, there may be no risk of a request subsequently received being processed first through a shorter internal path of the device 302A. Similarly, the device 302A and/or each producer may have a constraint that all loads (or other access types) are reflected via the switch 104. The other devices 302 and/or each consumer may have a constraint that all loads are performed locally (e.g., through the internal access path) or otherwise use shorter paths than a producer, as indicated in FIG. 3.

As a further example of constraints involving setting or otherwise controlling the access paths, an example of a constraint is on which one or more devices 302 and/or processing elements have requests forwarded to the switch 104. In at least one embodiment, only requests (e.g., when the requests involve one or more particular VAs) from producers and/or the device 302A may be forwarded to and/or processed using the switch 104.

A further example of a constraint is on whether a process(es) and/or other software has provided an indication that no race conditions will occur (e.g., for one or more particular and/or specified VAs). The indication may be provided for or with one or more particular requests and/or VAs and/or may include or indicate a period of time over (e.g., after which multicasting may not occur or may be performed using different constraints described herein).

For example, one or more devices 302 may have write access to one or more particular VAs, such as the VA 116A, whereas one or more other devices 302 may have read-only access. A device 302 (or processing element 106) having write access may be referred to herein as a producer and a device 302 having read-only access may be referred to herein as a consumer. By way of example and not limitation, only the device 302A may be a producer and the other devices 302 may be consumers in one or more embodiments. In various examples, a device 302 may be a producer or consumer for some VAs and not for others.

In one or more embodiments, the constraints may be imposed such that the results (e.g., returned values) of processing the requests using multicasting are consistent with the results of processing the requests without using multicasting. One or more additional or alternative constraints may be used depending on the configuration and capabilities of the collaborative processing environment 300.

In one or more embodiments, multicasting may be used to accelerate the processing of one or more requests which may otherwise have been processed using unicasting. In some embodiments, the one or more constraints may be used to ensure consistent results across each potential scenario. As such, whether multicasting or unicasting is used may be opaque to the programming model.

In accordance with one or more aspects of the disclosure, one or more multicasting operations may be performed in order to speed up memory access request processing. In one or more examples, multicasting operations may be performed instead of one or more unicasting operations. Thus, the number or processed requests may be reduced. Additionally or alternatively, one or more multicasting operations may be performed to speed up one or more future memory access operations.

As an example of the forgoing, the collaborative processing environment 300 may detect that a set of the processing elements 106 will store the same value to a plurality of the memories 110 using a plurality of requests, and process the plurality of requests using one or more multicasting operations. Additionally or alternatively, the collaborative processing environment 300 may detect that a set of the processing elements 106 will load the same value from a plurality of the memories 110 using a plurality of requests, and replicate the value in advance to each of the memories 110 using one or more multicasting operations. Thus, for example, the loads may be performed quickly from the local replicas (e.g., for consumers) as opposed to from the same PA which the process(s) may have mapped to the VA over slower paths. For example, as indicated in FIG. 3, loads for the devices 302B, 302C, and 302N may be performed from local replicas stored at the PAs 120B, 120C, and 120N respectively. This may be advantageous in various scenarios, such as where a synchronization barrier is enforced across the devices 302, and the devices 302 wait for the slowest load to complete.

Various approaches may be used to determine, identify, predict, and/or otherwise anticipate any combination of the forgoing scenarios so as to accelerate memory accesses in the collaborative processing environment 300. This may occur using any combination of the memory managers 108, the switch(es) 104, the memories 110, and/or other components (e.g., page tables, TLBs, drivers, etc.).

In one or more embodiments, the application and/or a process may provide a hint (e.g., using an API call and/or a driver level message) that the collaborative processing environment 300 may use to determine whether to implement any combination of the forgoing scenarios. For example, an application may allocate unicast memory (e.g., using an API call) with a hint indicating or specifying one or more VAs to replicate using multicasting (and/or which devices 102 to replicate to). By way of example and not limitation, when an allocation happens on the device 302A, a collective may be performed where the device 302A communicates with drivers on each other device 302 to be included in the multicast group. Thus may result in the device 302A allocating the backing memory for all the replicas including creation of the mappings, with a single pointer being returned for the VA and passed to one or more of devices 302 similar to a unicast pointer.

Additionally or alternatively, the collaborative processing environment 300 may increment counters or otherwise use monitoring or pattern recognition techniques to trigger one or more of the forgoing scenarios. For example, a store to a VA may be replicated (e.g., based on mapping the VA to multiple PAs) using multicasting to PAs based at least on counting or otherwise detecting or identifying a pattern such as requests involving groups of VAs that frequently store the same values to those or other PAs. By way of example and not limitation, when an allocation happens on the device 302A, the device 302A may allocate memory for a single copy rather than all replicas, with a single pointer being returned for the VA and passed to one or more of devices 302. When a pattern is identified, a driver of a device 302 may determine the VA should be replicated. In response, the driver may begin taking faults, handling faults, and/or otherwise transitioning the VA for multicasting.

Figure 4:
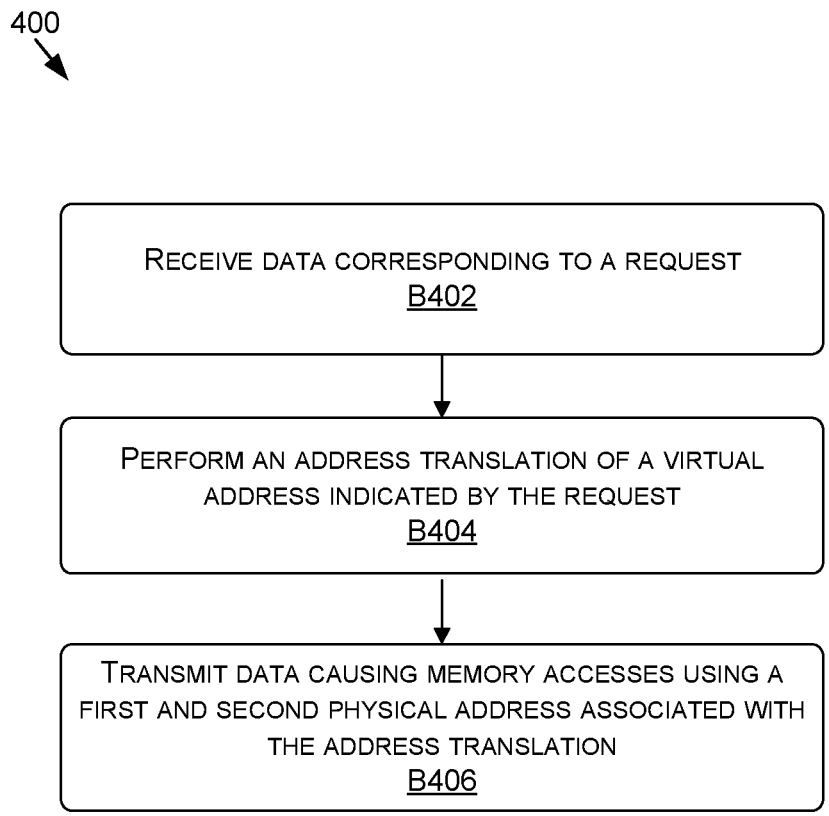
FIG. 4 is a flow diagram showing a method a memory manager may use to perform multicasting responsive to a request for a memory access operation, in accordance with some embodiments of the present disclosure.

Now referring to FIG. 4, each block of method 400, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 400 is described, by way of example, with respect to FIG. 1. However, these methods may additionally or alternatively be executed by any one system, or any combination of systems, including, but not limited to, those described herein.

FIG. 4 is a flow diagram showing a method 400 a memory manager may use to perform multicasting responsive to a request for a memory access operation, in accordance with some embodiments of the present disclosure.

The method 400, at block B402, includes receiving data corresponding to a request. For example, the memory manager 108A may receive first data corresponding to a request for a memory access operation from the processing element 106A. The request may indicate the VA 118.

The method 400, at block B404, includes performing an address translation of a virtual address indicated by the request. For example, the memory manager 108A may perform an address translation of the VA 118 using the first data. The address translation may include at least a portion of translating the VA 118 to at least the PA 120A corresponding to the processing element 106A of the processing elements 106 and the PA 120N corresponding to the processing element 106B of the processing elements 106.

The method 400, at block B406, includes transmitting data causing memory accesses using first and second physical addresses associated with the address translation. For example, the memory manager 108A may transmit second data (e.g., representing the PAs 120 or an intermediate address) to the switch 104 corresponding to a result of the address translation. The transmitting may cause memory accesses on the memories 110 using at least the PA 120A and the PA 120N responsive to the request.

Figure 5:
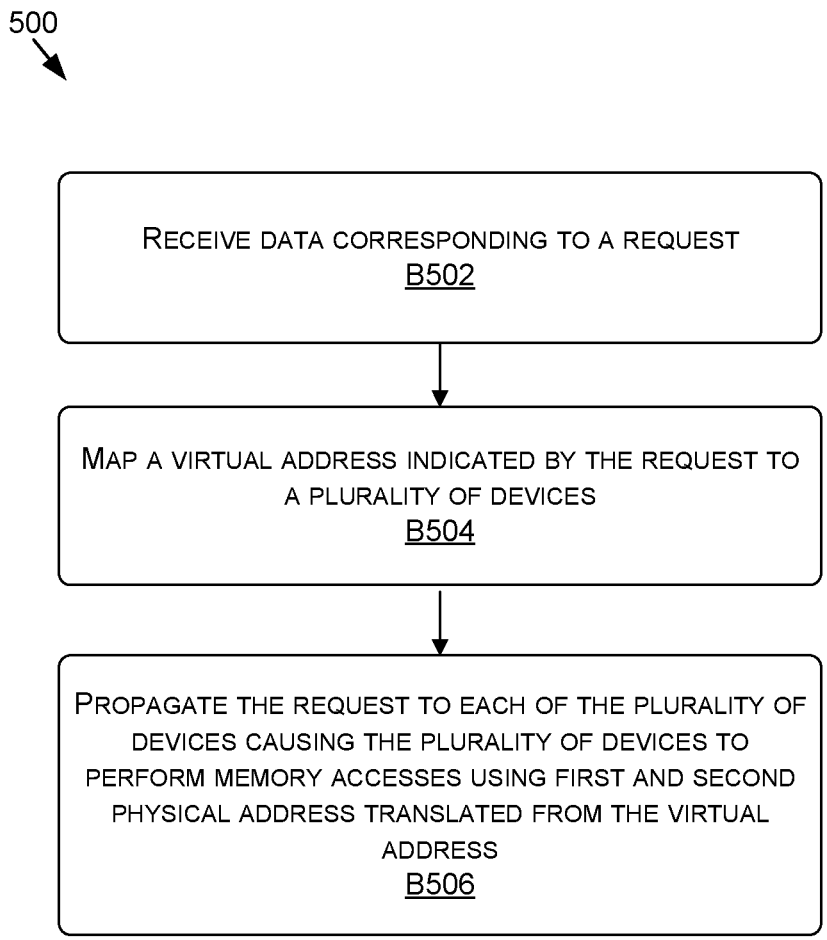
FIG. 5 is a flow diagram showing a method a switch may use to perform multicasting responsive to a request for a memory access operation, in accordance with some embodiments of the present disclosure.

Now referring to FIG. 5, FIG. 5 is a flow diagram showing a method 500 a switch may use to perform multicasting responsive to a request for a memory access operation, in accordance with some embodiments of the present disclosure.

The method 500, at block B502, includes receiving data corresponding to a request. For example, the switch 104 may receive data corresponding to a request from the processing element 106A for a memory access operation. The request may indicate the VA 118.

The method 500, at block B504, includes mapping a virtual address indicated by the request to a plurality of devices. For example, the switch 104 may map using the data, the VA 118 to the devices 102. In at least one embodiment, the mapping may use an intermediate address or the PAs 120 received from the memory manager 108A. In at least one embodiment, the mapping may include translating the VA 118 or the intermediate address to the PAs 120.

The method 500, at block B506, includes propagating the request to each of the plurality of devices causing the plurality of devices to perform memory accesses using at least first and second physical addresses translated from the virtual address. For example, the switch 104 may propagate the request to each of the devices 102. The propagating may cause, responsive to the request, at least the device 102A to perform a first memory access using the PA 120A translated from the VA 118 and the device 102N to perform a second memory access using the PA 120N translated from the VA 118.

Figure 6:
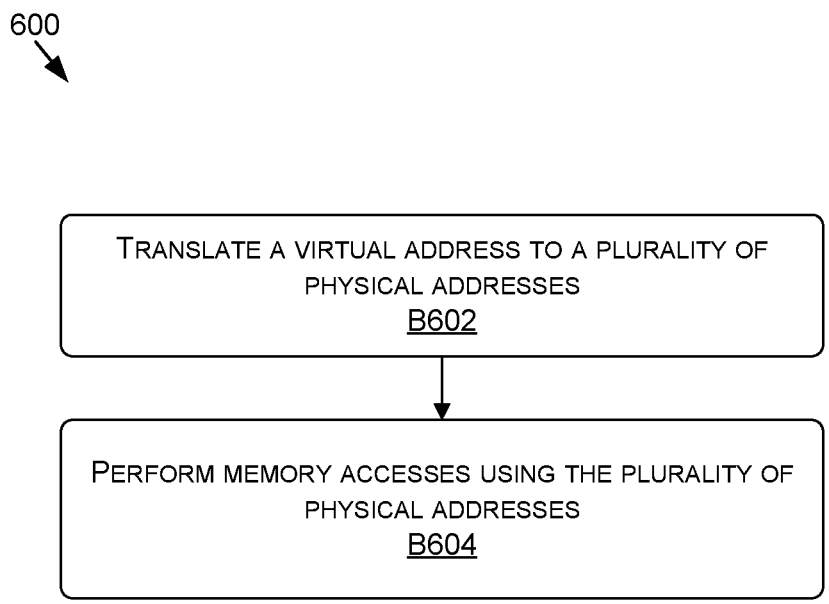
FIG. 6 is a flow diagram showing a method for multicasting responsive to a request for a memory access operation, in accordance with some embodiments of the present disclosure.

Now referring to FIG. 6, FIG. 6 is a flow diagram showing a method 600 for multicasting responsive to a request for a memory access operation, in accordance with some embodiments of the present disclosure.

The method 600, at block B602, includes translating a virtual address to a plurality of physical addresses. For example, one or more of the components of the collaborative processing environment 100 may perform one or more portions of translating the VA 118 indicated by a request for a memory access operation to the PAs 120 corresponding to the processing elements 106.

The method 600, at block B604, includes performing memory accesses using the plurality of physical addresses. For example, one or more of the components of the collaborative processing environment 100 may perform memory accesses using the PAs 120 responsive to the request.

Example Computing Device

Figure 7:
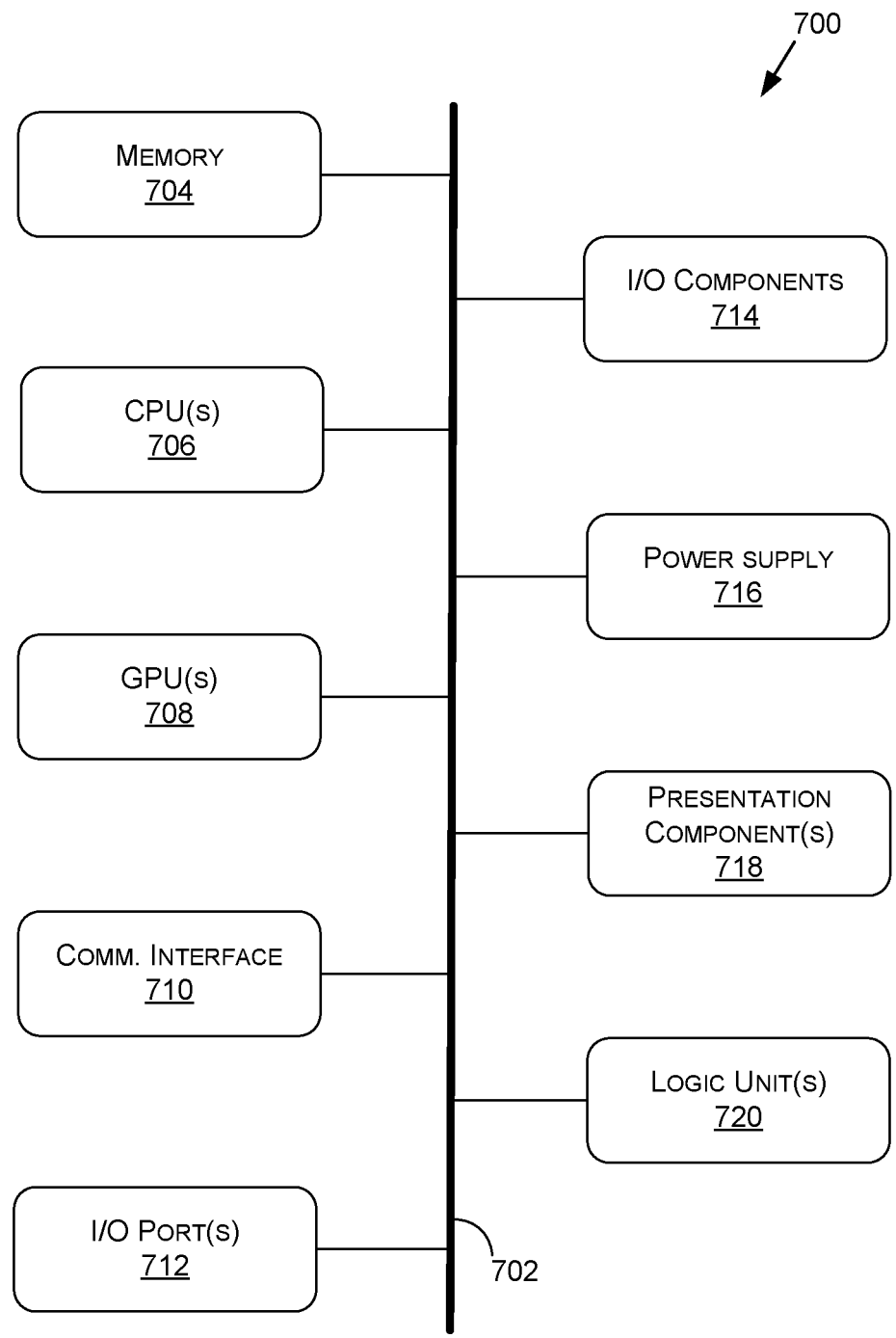
FIG. 7 is a block diagram of an example computing device suitable for use in implementing some embodiments of the present disclosure.

FIG. 7 is a block diagram of an example computing device(s) 700 suitable for use in implementing some embodiments of the present disclosure. Computing device 700 may include an interconnect system 702 that directly or indirectly couples the following devices: memory 704, one or more central processing units (CPUs) 706, one or more graphics processing units (GPUs) 708, a communication interface 710, input/output (I/O) ports 712, input/output components 714, a power supply 716, one or more presentation components 718 (e.g., display(s)), and one or more logic units 720. In at least one embodiment, the computing device(s) 700 may comprise one or more virtual machines (VMs), and/or any of the components thereof may comprise virtual components (e.g., virtual hardware components). For non-limiting examples, one or more of the GPUs 708 may comprise one or more vGPUs, one or more of the CPUs 706 may comprise one or more vCPUs, and/or one or more of the logic units 720 may comprise one or more virtual logic units. As such, a computing device(s) 700 may include discrete components (e.g., a full GPU dedicated to the computing device 700), virtual components (e.g., a portion of a GPU dedicated to the computing device 700), or a combination thereof.

Although the various blocks of FIG. 7 are shown as connected via the interconnect system 702 with lines, this is not intended to be limiting and is for clarity only. For example, in some embodiments, a presentation component 718, such as a display device, may be considered an I/O component 714 (e.g., if the display is a touch screen). As another example, the CPUs 706 and/or GPUs 708 may include memory (e.g., the memory 704 may be representative of a storage device in addition to the memory of the GPUs 708, the CPUs 706, and/or other components). In other words, the computing device of FIG. 7 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 7.

The interconnect system 702 may represent one or more links or buses, such as an address bus, a data bus, a control bus, or a combination thereof. The interconnect system 702 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 706 may be directly connected to the memory 704. Further, the CPU 706 may be directly connected to the GPU 708. Where there is direct, or point-to-point connection between components, the interconnect system 702 may include a PCIe link to carry out the connection. In these examples, a PCI bus need not be included in the computing device 700.

The memory 704 may include any of a variety of computer-readable media. The computer-readable media may be any available media that may be accessed by the computing device 700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 704 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 700. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 706 may be configured to execute at least some of the computer-readable instructions to control one or more components of the computing device 700 to perform one or more of the methods and/or processes described herein. The CPU(s) 706 may each include one or more cores (e.g., one, two, four, eight, twenty-eight, seventy-two, etc.) that are capable of handling a multitude of software threads simultaneously. The CPU(s) 706 may include any type of processor, and may include different types of processors depending on the type of computing device 700 implemented (e.g., processors with fewer cores for mobile devices and processors with more cores for servers). For example, depending on the type of computing device 700, the processor may be an Advanced RISC Machines (ARM) processor implemented using Reduced Instruction Set Computing (RISC) or an x86 processor implemented using Complex Instruction Set Computing (CISC). The computing device 700 may include one or more CPUs 706 in addition to one or more microprocessors or supplementary co-processors, such as math co-processors.

In addition to or alternatively from the CPU(s) 706, the GPU(s) 708 may be configured to execute at least some of the computer-readable instructions to control one or more components of the computing device 700 to perform one or more of the methods and/or processes described herein. One or more of the GPU(s) 708 may be an integrated GPU (e.g., with one or more of the CPU(s) 706 and/or one or more of the GPU(s) 708 may be a discrete GPU. In embodiments, one or more of the GPU(s) 708 may be a coprocessor of one or more of the CPU(s) 706. The GPU(s) 708 may be used by the computing device 700 to render graphics (e.g., 3D graphics) or perform general purpose computations. For example, the GPU(s) 708 may be used for General-Purpose computing on GPUs (GPGPU). The GPU(s) 708 may include hundreds or thousands of cores that are capable of handling hundreds or thousands of software threads simultaneously. The GPU(s) 708 may generate pixel data for output images in response to rendering commands (e.g., rendering commands from the CPU(s) 706 received via a host interface). The GPU(s) 708 may include graphics memory, such as display memory, for storing pixel data or any other suitable data, such as GPGPU data. The display memory may be included as part of the memory 704. The GPU(s) 708 may include two or more GPUs operating in parallel (e.g., via a link). The link may directly connect the GPUs (e.g., using NVLINK) or may connect the GPUs through a switch (e.g., using NVSwitch). When combined together, each GPU 708 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 706 and/or the GPU(s) 708, the logic unit(s) 720 may be configured to execute at least some of the computer-readable instructions to control one or more components of the computing device 700 to perform one or more of the methods and/or processes described herein. In embodiments, the CPU(s) 706, the GPU(s) 708, and/or the logic unit(s) 720 may discretely or jointly perform any combination of the methods, processes and/or portions thereof. One or more of the logic units 720 may be part of and/or integrated in one or more of the CPU(s) 706 and/or the GPU(s) 708 and/or one or more of the logic units 720 may be discrete components or otherwise external to the CPU(s) 706 and/or the GPU(s) 708. In embodiments, one or more of the logic units 720 may be a coprocessor of one or more of the CPU(s) 706 and/or one or more of the GPU(s) 708.

Examples of the logic unit(s) 720 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 710 may include one or more receivers, transmitters, and/or transceivers that enable the computing device 700 to communicate with other computing devices via an electronic communication network, included wired and/or wireless communications. The communication interface 710 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 720 and/or communication interface 710 may include one or more data processing units (DPUs) to transmit data received over a network and/or through interconnect system 702 directly to (e.g., a memory of) one or more GPU(s) 708.

The I/O ports 712 may enable the computing device 700 to be logically coupled to other devices including the I/O components 714, the presentation component(s) 718, and/or other components, some of which may be built in to (e.g., integrated in) the computing device 700. Illustrative I/O components 714 include a microphone, mouse, keyboard, joystick, game pad, game controller, satellite dish, scanner, printer, wireless device, etc. The I/O components 714 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be include depth cameras, such as stereoscopic camera systems, infrared camera systems, RGB camera systems, touchscreen technology, and combinations of these, for gesture detection and recognition. Additionally, the computing device 700 may include accelerometers or gyroscopes (e.g., as part of an inertia measurement unit (IMU)) that enable detection of motion. In some examples, the output of the accelerometers or gyroscopes may be used by the computing device 700 to render immersive augmented reality or virtual reality.

The power supply 716 may include a hard-wired power supply, a battery power supply, or a combination thereof. The power supply 716 may provide power to the computing device 700 to enable the components of the computing device 700 to operate.

The presentation component(s) 718 may include a display (e.g., a monitor, a touch screen, a television screen, a heads-up-display (HUD), other display types, or a combination thereof), speakers, and/or other presentation components. The presentation component(s) 718 may receive data from other components (e.g., the GPU(s) 708, the CPU(s) 706, DPUs, etc.), and output the data (e.g., as an image, video, sound, etc.).

Example Data Center

Figure 8:
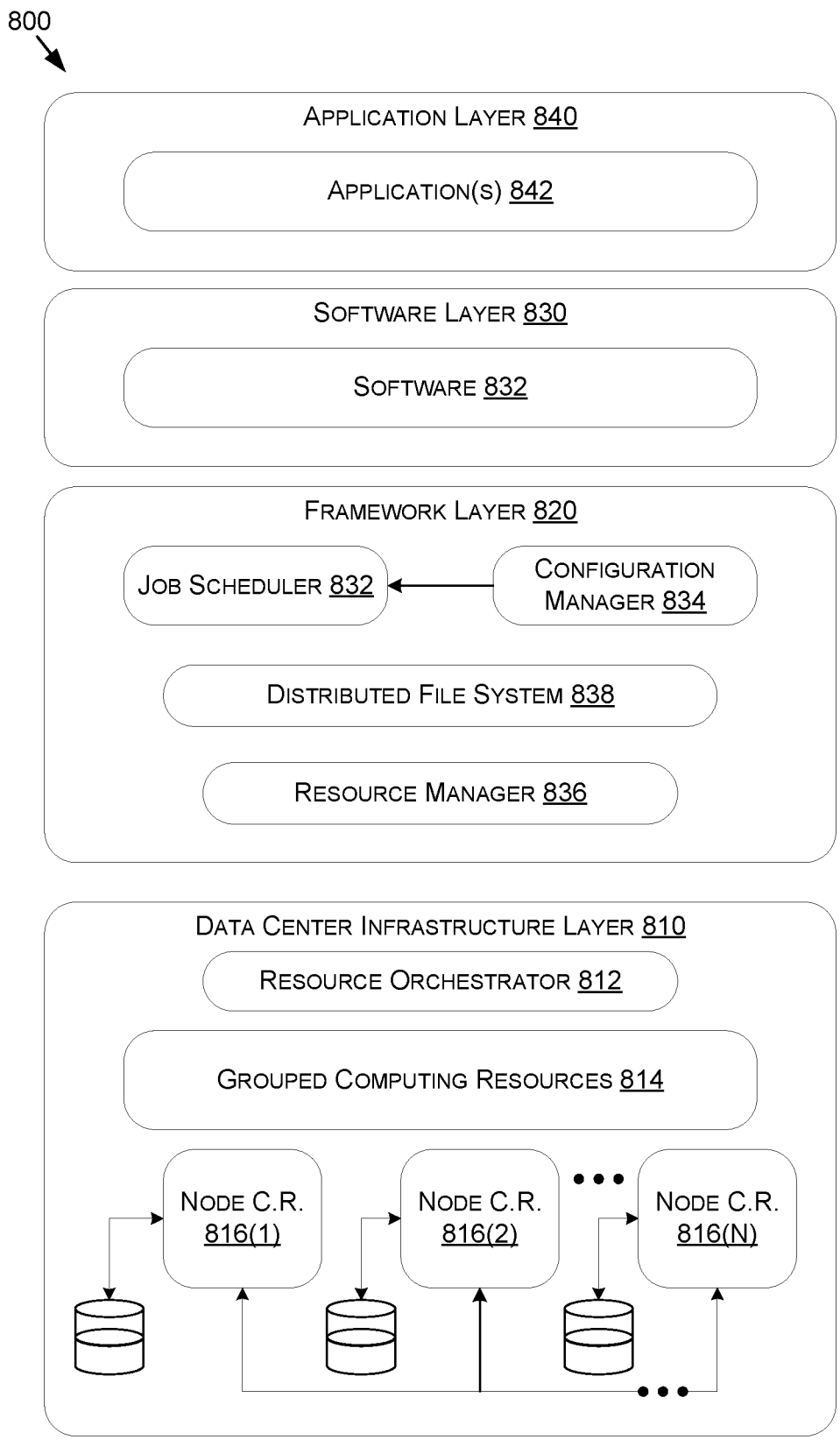
FIG. 8 is a block diagram of an example data center suitable for use in implementing some embodiments of the present disclosure.

FIG. 8 illustrates an example data center 800 that may be used in at least one embodiments of the present disclosure. The data center 800 may include a data center infrastructure layer 810, a framework layer 820, a software layer 830, and/or an application layer 840.

As shown in FIG. 8, the data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 816(1)-816(N) may correspond to a server having one or more of the above-mentioned computing resources. In addition, in some embodiments, the node C.R.s 816(1)-8161(N) may include one or more virtual components, such as vGPUs, vCPUs, and/or the like, and/or one or more of the node C.R.s 816(1)-816(N) may correspond to a virtual machine (VM).

In at least one embodiment, grouped computing resources 814 may include separate groupings of node C.R.s 816 housed within one or more racks (not shown), or many racks housed in data centers at various geographical locations (also not shown). Separate groupings of node C.R.s 816 within grouped computing resources 814 may include grouped compute, network, memory or storage resources that may be configured or allocated to support one or more workloads. In at least one embodiment, several node C.R.s 816 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 812 may configure or otherwise control one or more node C.R.s 816(1)-816(N) and/or grouped computing resources 814. In at least one embodiment, resource orchestrator 812 may include a software design infrastructure (SDI) management entity for the data center 800. The resource orchestrator 812 may include hardware, software, or some combination thereof.

In at least one embodiment, as shown in FIG. 8, framework layer 820 may include a job scheduler 832, a configuration manager 834, a resource manager 836, and/or a distributed file system 838. The framework layer 820 may include a framework to support software 832 of software layer 830 and/or one or more application(s) 842 of application layer 840. The software 832 or application(s) 842 may respectively include web-based service software or applications, such as those provided by Amazon Web Services, Google Cloud and Microsoft Azure. The framework layer 820 may be, but is not limited to, a type of free and open-source software web application framework such as Apache Spark™ (hereinafter "Spark") that may utilize distributed file system 838 for large-scale data processing (e.g., "big data"). In at least one embodiment, job scheduler 832 may include a Spark driver to facilitate scheduling of workloads supported by various layers of data center 800. The configuration manager 834 may be capable of configuring different layers such as software layer 830 and framework layer 820 including Spark and distributed file system 838 for supporting large-scale data processing. The resource manager 836 may be capable of managing clustered or grouped computing resources mapped to or allocated for support of distributed file system 838 and job scheduler 832. In at least one embodiment, clustered or grouped computing resources may include grouped computing resource 814 at data center infrastructure layer 810. The resource manager 836 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 838 of framework layer 820. One or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 838 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 834, resource manager 836, and resource orchestrator 812 may implement any number and type of self-modifying actions based on any amount and type of data acquired in any technically feasible fashion. Self-modifying actions may relieve a data center operator of data center 800 from making possibly bad configuration decisions and possibly avoiding underutilized and/or poor performing portions of a data center.

The data center 800 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 800. In at least one embodiment, trained or deployed machine learning models corresponding to one or more neural networks may be used to infer or predict information using resources described above with respect to the data center 800 by using weight parameters calculated through one or more training techniques, such as but not limited to those described herein.

In at least one embodiment, the data center 800 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 700 of FIG. 7—e.g., each device may include similar components, features, and/or functionality of the computing device(s) 700. In addition, where backend devices (e.g., servers, NAS, etc.) are implemented, the backend devices may be included as part of a data center 800, an example of which is described in more detail herein with respect to FIG. 8.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 700 described herein with respect to FIG. 7. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-usable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A computer-implemented method comprising:
receiving, from an application, a mapping instruction that specifies to configure a virtual address (VA) as a multicast VA for a first physical address (PA) and a second PA;
responsive to the mapping instruction, configuring the VA as the multicast VA for the first PA and the second PA;
receiving, from the application, an instruction for a memory access operation, the instruction indicating the VA;
based at least on identifying the VA in the instruction and the configuring of the VA as the multicast VA, performing one or more address translations of an address translation that maps the VA to at least the first PA corresponding to a first processing element (PE) of a plurality of PEs and the second PA corresponding to a second PE of the plurality of PEs; and
transmitting one or more translated addresses resulting from the one or more address translations of the address translation, the transmitting causing memory accesses on one or more memories using the first PA and the second PA responsive to the instruction.

2. The method of claim 1, wherein the performing of the one or more address translations and the transmitting are performed by a memory management unit (MMU) in response to the MMU receiving the instruction.

3. The method of claim 1, wherein the VA is within a multicast VA space and at least one other VA is within a unicast VA space that is separate from the multicast VA space.

4. The method of claim 1, wherein one or more applications running on one or more of the plurality of PEs assigned the VA to a multicast group that includes the first PE and the second PE.

5. The method of claim 1, further comprising determining that the address translation is to translate the VA to one or more intermediate addresses prior to translating the VA to the first PA and the second PA based at least on the identifying indicating the VA is a multicast VA, wherein a presence of the one or more intermediate address indicates the address translation is a multicasting memory operation.

6. The method of claim 1, wherein the configuring includes allocating memory for the first PA and the second PA and creating the VA as an alias for the first PA and the second PA.

7. The method of claim 1, wherein the VA indicates that the instruction is to be processed as a multicast memory access, and the method further includes based at least on determining, using the VA, that the instruction is to be processed as a multicast memory access, evaluating whether there is a mismatch between an instruction type of the instruction and the instruction being processed as a multicast memory access, wherein the performing of the one or more address translations is based at least on the evaluating.

8. The method of claim 1, wherein the one or more translated addresses include one or more intermediate addresses, and the transmitting is to a switch that uses the one or more intermediate address to propagate the instruction resulting in completion of the address translation to the first PA and the second PA.

9. The method of claim 1, wherein the one or more translated addresses include the first PA and the second PA.

10. A computer-implemented method comprising:
receiving, from an application, a mapping instruction that specifies to configure a virtual address (VA) as a multicast VA for a first physical address (PA) and a second PA;
responsive to the mapping instruction, configuring the VA as the multicast VA for the first PA and the second PA;
receiving, from the application, an instruction comprising a request for a memory access operation, the instruction indicating the VA;
based at least on the VA being identified in the instruction and the configuring of the VA as the multicast VA, mapping the VA to a first device corresponding to the first PA and a second device corresponding to the second PA; and
based at least on the mapping, propagating the request to each of a plurality of devices, the propagating causing, responsive to the instruction, the first device of the plurality of devices to perform a first memory access using the first PA translated from the VA and the second device of the plurality of devices to perform a second memory access using the second PA translated from the VA.

11. The method of claim 10, wherein, the mapping of the virtual address and the propagating of the request are performed by a switch that is external to each of the plurality of devices.

12. The method of claim 10, wherein the first device includes a first graphics processing unit and the second device includes a second graphics processing unit.

13. The method of claim 10, wherein the first PA corresponds to a first processing element (PE) of the first device and the second PA corresponds to a second PE of the second device.

14. The method of claim 10, wherein the VA is within a multicast VA space and at least one other VA is within a unicast VA space that is separate from the multicast VA space.

15. The method of claim 10, wherein the mapping of the VA is to multiple devices based at least on one or more applications running on one or more of the plurality of devices assigning the VA to a multicast group.

16. The method of claim 10, wherein a multicast memory access is selected for the request rather than a unicast memory access based at least on analyzing one or more patterns associated with requests for memory access operations based at least on the requests for memory access operations corresponding to the VA.

17. The method of claim 10, wherein the first memory access includes loading one or more values from the first PA, and the method further includes:
receiving the one or more values from the first device; and
transmitting the one or more values to the first device based at least on the receiving of the one or more values.

18. One or more devices comprising:
one or more hardware components configured to:
perform one or more translations of an address translation of a virtual address (VA) to a plurality of physical addresses (PAS) including a first PA corresponding to a first processing element of a plurality of physical processing elements and a second processing element of the plurality of processing elements, the performance being based at least on the VA being identified in an instruction, from an application, for a memory access operation and the VA being configured responsive to a mapping instruction, from the application, that specifies to configure the VA as a multicast VA for the plurality of PAs; and
perform memory accesses using the plurality of physical addresses responsive to the instruction.

19. The one or more devices of claim 18, wherein at least one translation of the one or more translations is performed by a memory management unit.

20. The one or more devices of claim 18, wherein the memory access operation includes loading values from the plurality of physical addresses, combining the values into an aggregated value, and providing the aggregated value in response to the instruction.

* * * * *